United States Patent [19]

Crombie et al.

[11] 4,151,830

[45] May 1, 1979

[54] INFLATED FLEXIBLE SOLAR COLLECTORS

[75] Inventors: Terence G. Crombie, Rolling Meadows, Ill.; Lance B. Crombie, Webster, Minn.

[73] Assignee: Chicago Solar Corporation, Chicago, Ill.

[21] Appl. No.: 844,383

[22] Filed: Oct. 21, 1977

[51] Int. Cl.² ............................................. F24J 3/02
[52] U.S. Cl. .................................. 126/271; 126/270; 203/DIG. 1
[58] Field of Search ............................ 126/270, 271; 203/DIG. 1; 237/1 A; 165/168, 169, 170; 5/365, 366

[56] References Cited

U.S. PATENT DOCUMENTS

| | | | |
|---|---|---|---|
| 3,022,781 | 2/1962 | Andrassy | 126/271 |
| 3,052,228 | 9/1962 | Okuda | 126/271 |
| 3,415,719 | 12/1968 | Telkes | 126/271 |
| 3,859,980 | 1/1976 | Crawford | 126/271 |
| 3,876,486 | 4/1975 | Pennington | 5/365 X |
| 3,959,835 | 6/1976 | Nos | 5/368 |
| 4,006,856 | 2/1977 | Nilsson | 237/1 A |
| 4,036,209 | 7/1977 | Press | 126/271 |
| 4,059,095 | 11/1977 | Grundmann et al. | 126/271 |
| 4,073,021 | 2/1978 | Carlisle | 5/365 |

FOREIGN PATENT DOCUMENTS 1422306  11/1965  France ........................................ 5/457

*Primary Examiner*—William F. O'Dea
*Assistant Examiner*—Larry Jones
*Attorney, Agent, or Firm*—Dressler, Goldsmith, Clement, Gordon & Shore, Ltd.

[57] ABSTRACT

An inflatable collector for solar energy is provided in which superposed layers of plastic sheet material are heat sealed to one another to provide a pair of layers providing an absorber unit in which the upper layer is pigmented to absorb solar radiation and the pair of layers are sealed to one another in a pattern providing a continuous elongated path. Fluid is supplied to one end of this elongated path and at least one transparent layer is provided overlying the pair of layers, to provide a return space above the pair of layers, and valve means are provided to interconnect the end of the elongated path remote from the fluid supply end with the return space so that fluid heated in the elongated path is further heated in the return space before being withdrawn from the collector.

16 Claims, 5 Drawing Figures

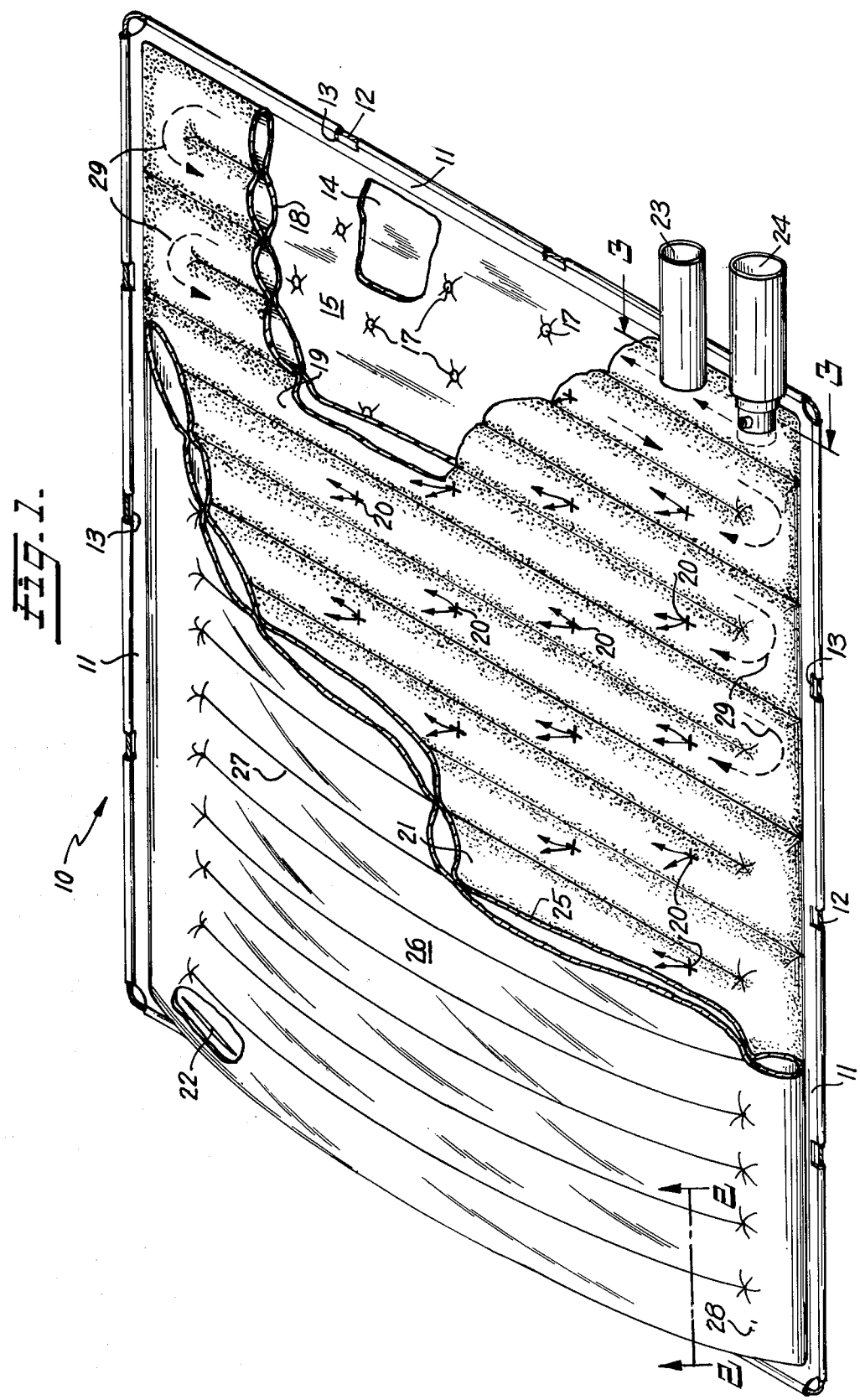

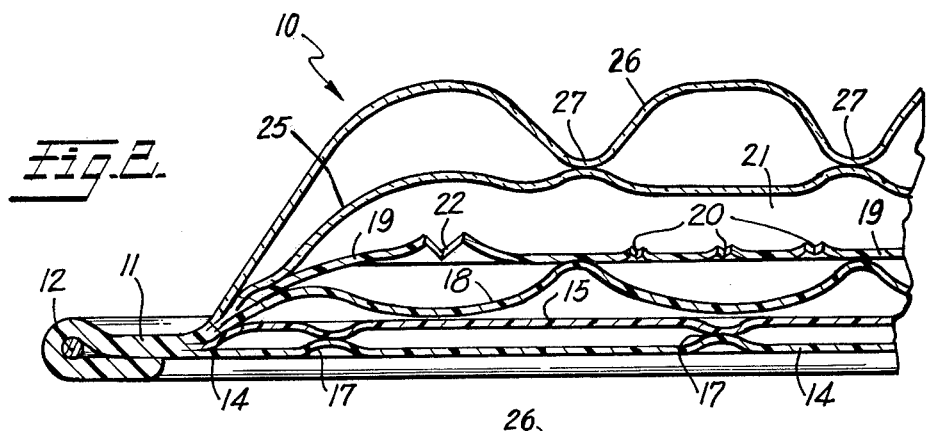
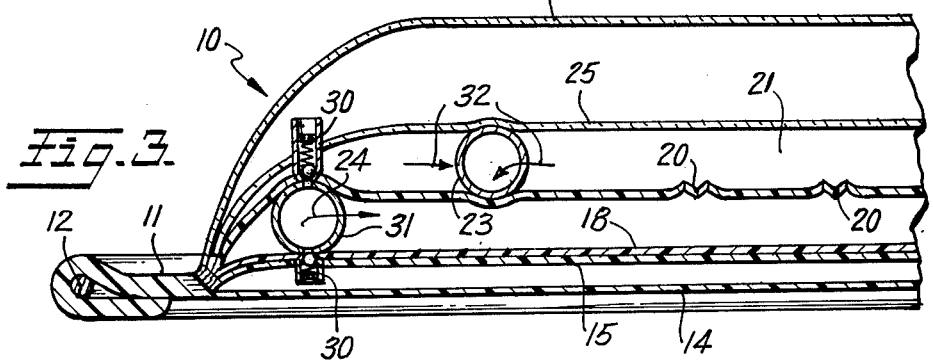
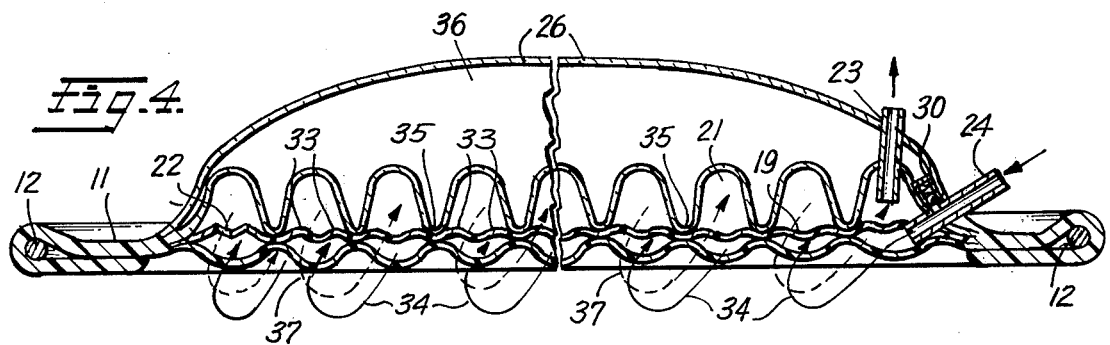
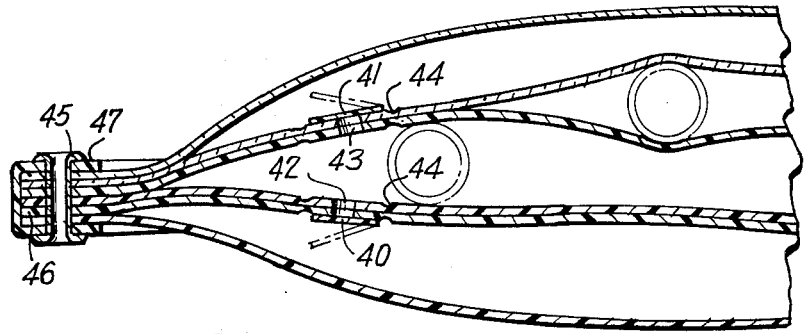

INFLATED FLEXIBLE SOLAR COLLECTORS

The present invention relates to inflated flexible solar collectors.

The need for low cost, durable and efficient collectors for solar energy to enable the heating of homes, factories and swimming pools is well known, and this is the objective of this invention.

In accordance with this invention, an inflatable collector for solar energy is provided in which superposed layers of plastic sheet material are heat sealed, taped or glued to one another to preferably provide at least one lower layer of static air for insulating the underside of the collector, a pair of layers above the lower layer providing an absorber unit, the upper of said pair of layers being pigmented to absorb solar radiation and the pair of layers being sealed to one another in a pattern providing a continuous elongated path through the absorber unit. Fluid is supplied into one end of the elongated path and at least one layer of transparent sheet material overlies the absorber unit to provide a return space above the pair of layers, and means interconnect the end of the elongated path remote from the supply end with the return space so that fluid heated in the elongated path is further heated in the return space before being withdrawn therefrom.

A feature of the invention is the double pass of the fluid being heated with respect to the upper layer of the heat absorber unit which provides the heat absorbing surface. This double pass increases the temperature of the fluid which is removed from a collector of given size and flow capacity.

It is also important to insulate the collector from the air and from the underlying support. For this purpose, pairs of layers are both above and below the absorber unit, and these are inflated with static air.

Another feature of the invention is the employment of a pair of inflated transparent layers which are sealed together in parallel lines to form ribs which insulate the hot fluid return while it simultaneously provides improved resistance to wind damage and improved absorption of solar energy.

The above features of this invention may be used alone or preferably in combination with one another. Other and further features of the invention will be apparent from the following description of the drawings in which:

FIG. 1 is a perspective view with portions cut away showing an illustrative inflatable collector for solar energy constructed in accordance with the invention;

FIG. 2 is a cross-section taken at the line 2—2 of FIG. 1 to further show the disposition of the layers;

FIG. 3 is a cross-section taken on the line 3—3 of FIG. 1 showing the inlet and outlet structures and the check valves used to inflate the overlying layers and the lower layers which insulate the collector;

FIG. 4 is a sectional view digrammatically illustrating an alternate form of the invention of simplified construction, and FIG. 5 is another cross-section on the line 3—3 of FIG. 1 showing preferred construction at the air inlet and outlet zone.

Referring more particularly to FIG. 1, the numeral 10 identifies an inflatable solar energy collector formed by a plurality of flexible plastic layers which are sealed together at their peripheries 11 to form a mattress-type structure. The periphery 11 is preferably reinforced with a wire, rope or semiridged plastic pipe 12 and portions of the sealed periphery are notched out at 13 to enable the collector 10 to be tied down with ropes, rubber binders or stakes.

Referring first to the lowermost layers 14, and 15, these are inflated thru check valve 30 when the fluid being heated is air (see FIG. 3) and optionally given structural stability by securements 17. The layers 14 and 15 are normally constituted by black-pigmented thermoplastic, and they serve, especially when inflated, to insulate the underside of the collector.

Above the insulating layers 14 and 15 are layers 18 and 19 which together provide an absorber unit. Layer 19, and optionally also layer 18, is pigmented, preferably with solar selective coatings or pigments, to absorb solar energy. Layers 18 and 19 are sealed in a pattern which forms a continuous elongated path 29 which may be termed a serpentine path. Layer 19 is formed with small slits 20, which allow fluid to pass through and agitate the contents in the return space 21 which overlies the layer 19. Valve means 22 allow the fluid between layers 18 and 19 to pass through layer 19 at the remote end of path 29 and enter return space 21 below layer 25. The fluid in the return space 21 is further heated and removed through outlet 23, which is positioned near the cool air inlet 24. The fluid in the structure shown in FIG. 1 is preferably air, but water can be used, especially when the underlayers are not inflated.

The overlying layers 25 and 26 are of clear plastic material to allow solar energy to pass through and reach the pigmented layer 19. On the other hand, infra-red radiation emitted by layer 19 is reflected by the layers 25 and 26, and these layers may be treated to maximize reflection of infra-red radiation in order to keep it from escaping from the collector. The layers 25 and 26 are sealed together in parallel lines to provide ribs 27 and these layers are inflated with some of the cold air entering at 24 via check valve 30. Ribs 27 provide structural stability and also serve to enhance absorption of solar radiation. This occurs because solar radiation which strikes the ribs at an angle can be reflected off the surface of a rib remote from the radiation into the near surface of the adjacent rib. The radiation striking the near surface of any rib hits it at a steeper angle and penetrates the layer 26 more easily. A relief valve 28 may be used to deflate the overlying layers 25 and 26, and a similar relief valve can be used to deflate the lowermost layers 14 and 15. The inflated layers 14 and 15 and 25 and 26 remain inflated when the fan blowing air through air inlet 24 is shut off, so the unit retains its strength and wind resistance when not in operation. The plastic layers are preferably 0.006 inch or thicker for mechanical integrity.

Referring more particularly to FIG. 2, a portion of the solar energy collector 10 is shown in cross-section to better show the air agitators 20 and the valve means 22 which allow the contents of the absorber unit to pass from between layers 18 and 19 to the return space 21 between layers 19 and 25. This crosssection also shows how layers 14 and 15 join together to form an inflated insulative underlayer which can be parallel or spot secured as shown at 17 to add rigidity to the collector.

Referring more particularly to FIG. 3, cold air enters the collector via a venturi tube 24 which is the sole source of air in the collector 10. This air under pressure causes inflation of the paired upper layers 25 and 26, and the paired underlayers 14 and 15. This is achieved by connections containing check valves which extend from tube 24 through layers 25 and 15 as shown. This connection and check valve assembly is identified by numeral 30. Cold air indicated by arrow 31 passes below pigmented layer 19 and above optionally pigmented layer 18 and the contact with heated layer 19 heats the air. Agitator slits 20 allow small amounts of heated air held between layers 18 and 19 to bleed into the return space 21 and agitate the air in the return space, this air moving as shown by arrow 32 toward the hot air outlet 23.

In the preferred structure shown in FIG. 5, the air inlet and air outlet are shown in phantom, and the pressure of the air near the inlet opens flap valves 40 and 41 which cover aligned openings 42 and 43, respectively to inflate the upper and lower units of the solar mattress. The layers surrounding the openings 42 and 43 are heat sealed to one another as indicated at 44, so that static air is confined where it is desired. FIG. 5 also shows a grommet 45 used to seal the margin 46 of the mattress via protective U-shaped marginal area 47.

FIG. 4 shows an optional embodiment of the invention which is characterized by a simplified construction. In this form of the invention, only a single overlying layer 26 is used, and cold air inlet 24 inflates the insulating area 36 between the transparent layer 25 and the overlying layer 26. The action is the same as shown in the previous figures in that some air entering the absorber unit between layers 18 and 19 via tube 24 inflates the insulating area 36 by means of a tube and check valve assembly 30. The air is heated in the absorber unit where it follows a serpentine path indicated by arrow 34 and finally reaches valve means 22 at the end of the path. The partially heated air rises through the valve means 22 into the return air space 21 where it is further heated and agitated by undulations 33 in layer 19. The return air follows a return serpentine path 37 back to the hot air outlet 23. In this simplified construction, the four layers 26, 25, 19 and 18 are sealed at their peripheries 11 which is reinforced by wire, ropes or tubing 12. The underlying layers are omitted in this simplified construction. When a liquid, such as water, is heated, the insulating area 36 is separately inflated with air.

The solar collector may include thermostats for operating the air supply fan only when the sun is shining, and other operational features may be added for special purpose. The plastic materials used may be of any type which as polyethylene, Mylar, Tedlar or any suitable flexible, sealable plastic. The dimensions may be any shape or configuration, but generally rectangular is best.

The invention is defined in the claims which follow. We claim:

1. An inflatable collector for solar energy comprising superposed layers of plastic sheet material which are heated sealed to one another to provide at least one lower layer for insulating the underside of the collector, a pair of layers above said lower layer providing an absorber unit, the upper of said pair of layers being pigmented to absorb solar radiation and said pair of layers being sealed to one another in a pattern providing a continuous elongated path through said absorber unit, means for supplying a fluid into one end of said elongated path, at least one layer overlying said absorber unit, said overlying layer being transparent and providing a return space above said pair of layers, and valve means interconnecting the end of said elongated path remote from the supply end with said return space whereby fluid heated in said elongated path is further heated in said return space, and means for withdrawing heated fluid from said return space.

2. An inflatable solar collector as recited in claim 1 in which said fluid is air.

3. An inflatable solar collector as recited in claim 2 in which said pigmented layer is slit to provide vents along the length of said elongated path to agitate the air in said return space.

4. An inflatable solar collector as recited in claim 2 in which a pair of lower layers is used to insulate the underside of the collector and a pair of transparent layers overlie said absorber unit, each of said lower layers and said transparent layers being sealed to one another and inflated with air.

5. An inflatable solar collector as recited in claim 4 in which the means for supplying air to said elongated path includes means comprising a check valve for maintaining the inflation of said lower layers and said transparent layers.

6. An inflatable solar collector as recited in claim 1 in which a pair of lower layers is used to insulate the underside of the collector, said lower layers being sealed to one another and inflated with air.

7. An inflatable solar collector as recited in claim 1 in which a pair of transparent layers overlie said absorber unit, said transparent layers being sealed to one another and inflated with air.

8. An inflatable solar collector as recited in claim 7 in which said transparent layers are sealed to one another in parallel spaced apart lines to form a series of inflated ribs.

9. An inflatable solar collector as recited in claim 1 in which said elongated path is provided by parallel seal lines which form a serpentine path.

10. An inflatable solar collector as recited in claim 9 in which said pigmented layer is also sealed to said overlying transparent layer to provide a return space.

11. An inflatable solar collector as recited in claim 1 in which said heat sealed layers provide tie down areas at the margins thereof.

12. An inflatable solar collector as recited in claim 1 in which the heated fluid is withdrawn from said return space at a point close to the fluid supply means.

13. An inflatable collector for solar energy comprising superposed layers of plastic sheet material which are secured to one another to provide at least one lower layer for insulating the underside of the collector, a first pair of layers above said lower layer providing an absorber unit, the upper of said first pair of layers being pigmented to absorb solar radiation and said first pair of layers being sealed to one another in a pattern providing a continuous elongated path through said absorber unit, means for supplying air into one end of said elongated path, a second pair of layers overlying said absorber unit said overlying layers being transparent and being sealed to each other along spaced apart lines to provide parallel ribs, a return space above said first pair of layers and below said second pair of layers, valve means interconnecting the end of said elongated path remote from the air supply end with said return space whereby air heated in said elongated path is further heated in said return space, and means for withdrawing heated air from said return space.

14. An inflatable solar collector as recited in claim 13 in which a pair of lower layers is used to insulate the underside of the collector and a pair of transparent layers overlie said absorber unit, each of said lower layers and said transparent layers being sealed to one another and inflated with air.

15. An inflatable solar collector as recited in claim 14 in which said pigmented layer is slit to provide vents along the length of said elongated path to agitate the air in said return space.

16. An inflatable solar collector as recited in claim 14 in which the means for supplying air to said elongated path includes means comprising a check valve for maintaining the inflation of said lower layers and said transparent layers.

* * * * *